US010422288B1

United States Patent
Hamad et al.

(10) Patent No.: US 10,422,288 B1
(45) Date of Patent: Sep. 24, 2019

(54) ADSORBENT CIRCULATION FOR ONBOARD OCTANE ON-DEMAND AND CETANE ON-DEMAND

(71) Applicant: Saudi Arabian Oil Company, Dhahran (SA)

(72) Inventors: Esam Zaki Hamad, Dhahran (SA); Eman AbdelHakim A. M. Tora, Faisal (EG); Amer A. Amer, Dhahran (SA); Junseok Chang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/939,930

(22) Filed: Mar. 29, 2018

(51) Int. Cl.
| | |
|---|---|
| *F02M 25/10* | (2006.01) |
| *B01D 53/00* | (2006.01) |
| *F02D 19/06* | (2006.01) |
| *B01D 61/36* | (2006.01) |
| *F02D 33/00* | (2006.01) |
| *F02B 3/12* | (2006.01) |

(52) U.S. Cl.
CPC ....... *F02D 19/0649* (2013.01); *B01D 61/362* (2013.01); *F02B 3/12* (2013.01); *F02D 33/003* (2013.01); *F02D 19/0671* (2013.01); *F02D 19/0694* (2013.01)

(58) Field of Classification Search
CPC ............ F02M 25/0854; F02M 25/089; B01D 53/9413; B01D 53/229; B01D 53/261; B01D 53/263; B01D 53/944; B01D 15/00
See application file for complete search history.

(56) References Cited

U.S. PATENT DOCUMENTS

| | | | |
|---|---|---|---|
| 3,985,108 | A | 10/1976 | Matsumoto et al. |
| 4,212,276 | A | 7/1980 | Kaneda |
| (Continued) | | | |

FOREIGN PATENT DOCUMENTS

| | | |
|---|---|---|
| CN | 102399602 A | 4/2012 |
| CN | 202226834 U | 5/2012 |
| (Continued) | | |

OTHER PUBLICATIONS

International Search Report and Written Opinion pertaining to International Application PCT/US2018/054182, dated Dec. 19, 2018, 14 pages.

(Continued)

*Primary Examiner* — Long T Tran
(74) *Attorney, Agent, or Firm* — Dinsmore & Shohl, LLP

(57) ABSTRACT

A vehicular propulsion system, a vehicular fuel system and a method of operating an internal combustion engine. A separation unit that makes up a part of the fuel system may selectively receive and separate at least a portion of onboard fuel and a flowable adsorbent in order to separate the fuel into octane-enhanced and cetane-enhanced fuel components. A controller may be used to determine a particular operating condition of the internal combustion engine such that the onboard fuel can be sent to one or more combustion chambers within the internal combustion engine without first passing through the separation unit during one operating condition, or instead to the separation unit in situations where the internal combustion engine may require an octane-rich or cetane-rich mixture in another operating condition.

20 Claims, 6 Drawing Sheets

(56) References Cited

U.S. PATENT DOCUMENTS

| | | | |
|---|---|---|---|
| 4,308,841 A | 1/1982 | Kingsley | |
| 4,963,745 A | 10/1990 | Maggard | |
| 5,018,645 A | 5/1991 | Zinsmeyer | |
| 5,132,486 A * | 7/1992 | Wylie | C10G 25/03 |
| | | | 208/310 R |
| 5,357,908 A | 10/1994 | Sung et al. | |
| 5,649,517 A | 7/1997 | Poola et al. | |
| 5,794,601 A | 8/1998 | Pantone | |
| 5,979,705 A | 11/1999 | Kaehler et al. | |
| 6,055,808 A | 5/2000 | Poola et al. | |
| 6,067,973 A | 5/2000 | Chanda et al. | |
| 6,112,134 A | 8/2000 | Terranova et al. | |
| 6,119,637 A | 9/2000 | Matthews et al. | |
| 6,161,060 A | 12/2000 | Collins | |
| 6,163,738 A | 12/2000 | Miller | |
| 6,173,567 B1 | 1/2001 | Poola et al. | |
| 6,230,693 B1 | 5/2001 | Meiller et al. | |
| 6,332,448 B1 | 12/2001 | Ilyama et al. | |
| 6,352,068 B1 | 3/2002 | Jacobsen | |
| 6,380,859 B1 | 4/2002 | Brownlee | |
| 6,422,465 B2 | 7/2002 | Miller | |
| 6,494,192 B1 | 12/2002 | Capshaw et al. | |
| 6,505,134 B2 | 1/2003 | Poleshuk et al. | |
| 6,742,507 B2 | 6/2004 | Keefer et al. | |
| 6,972,093 B2 | 12/2005 | Partridge et al. | |
| 7,032,629 B1 | 4/2006 | Mattingly et al. | |
| 7,100,543 B2 | 9/2006 | Davidson | |
| 7,370,610 B2 | 5/2008 | Ashford et al. | |
| 7,377,272 B2 | 5/2008 | Davidson | |
| 7,455,046 B2 | 11/2008 | Biruduganti et al. | |
| 7,459,592 B2 | 12/2008 | Wolf et al. | |
| 7,523,770 B2 | 4/2009 | Horowitz et al. | |
| 7,900,607 B2 | 3/2011 | Lang et al. | |
| 7,954,478 B1 | 6/2011 | Schechter | |
| 7,958,872 B1 | 6/2011 | Schechter | |
| 8,046,984 B1 | 11/2011 | Schechter | |
| 8,051,828 B2 | 11/2011 | Sengupta et al. | |
| 8,118,009 B2 | 2/2012 | Pursifull et al. | |
| 8,141,356 B2 | 3/2012 | Leone et al. | |
| 8,211,300 B2 | 7/2012 | Partridge et al. | |
| 8,258,363 B2 | 9/2012 | Kalakkunnath et al. | |
| 8,375,899 B2 | 2/2013 | Leone et al. | |
| 8,459,238 B2 | 6/2013 | Pursifull et al. | |
| 8,580,111 B2 | 11/2013 | Partridge et al. | |
| 8,656,869 B2 | 2/2014 | Leone et al. | |
| 8,991,358 B2 | 3/2015 | Gehrke | |
| 9,422,147 B2 | 8/2016 | Bartlett et al. | |
| 9,776,624 B1 | 10/2017 | Leone et al. | |
| 2004/0065076 A1 | 4/2004 | Katoh et al. | |
| 2005/0055874 A1 | 3/2005 | Bekemeyer | |
| 2005/0056264 A1 | 3/2005 | Weissman et al. | |
| 2005/0066576 A1 | 3/2005 | Morris et al. | |
| 2005/0222748 A1 | 10/2005 | Naik et al. | |
| 2006/0009670 A1 | 1/2006 | Briot et al. | |
| 2006/0037589 A1 | 2/2006 | Gupta et al. | |
| 2007/0107676 A1 | 5/2007 | Davidson | |
| 2007/0256665 A1 | 11/2007 | Sun et al. | |
| 2008/0041226 A1 | 2/2008 | Hiltzik et al. | |
| 2008/0098985 A1 | 5/2008 | Kamio | |
| 2008/0196695 A1 | 8/2008 | Storhok et al. | |
| 2008/0202118 A1 | 8/2008 | Ide et al. | |
| 2008/0308073 A1 | 12/2008 | Allen et al. | |
| 2008/0308074 A1 | 12/2008 | Allen et al. | |
| 2008/0308075 A1 | 12/2008 | Allen et al. | |
| 2009/0165759 A1 | 7/2009 | Sengupta et al. | |
| 2009/0255875 A1 | 10/2009 | Unger et al. | |
| 2011/0023841 A1 | 2/2011 | Ucke et al. | |
| 2012/0006504 A1 | 1/2012 | Sugiura | |
| 2012/0031812 A1 | 2/2012 | Paggi | |
| 2012/0192834 A1 | 8/2012 | Tonery | |
| 2013/0168311 A1 | 7/2013 | Johnson et al. | |
| 2013/0213349 A1 | 8/2013 | Sellnau et al. | |
| 2013/0255493 A1 * | 10/2013 | Gupta | B64D 37/32 |
| | | | 95/143 |
| 2013/0269521 A1 | 10/2013 | Nishita et al. | |
| 2013/0289850 A1 | 10/2013 | Johnson et al. | |
| 2015/0114362 A1 * | 4/2015 | Costa-Patry | F02D 17/04 |
| | | | 123/521 |
| 2015/0353853 A1 | 12/2015 | Iwashita et al. | |
| 2016/0076492 A1 | 3/2016 | Leone et al. | |
| 2016/0265493 A1 | 9/2016 | Bima | |
| 2016/0313171 A1 | 10/2016 | Dudar et al. | |
| 2016/0368373 A1 | 12/2016 | Dudar et al. | |
| 2017/0122668 A1 | 5/2017 | Fujii et al. | |
| 2017/0211532 A1 * | 7/2017 | Yamauchi | F02M 37/0023 |
| 2017/0234276 A1 | 8/2017 | Hamad et al. | |
| 2017/0246614 A1 | 8/2017 | Eddaoudi et al. | |
| 2017/0282708 A1 | 10/2017 | Hamad et al. | |

FOREIGN PATENT DOCUMENTS

| | | |
|---|---|---|
| CN | 103045285 A | 4/2013 |
| DE | 102004049218 A1 | 4/2006 |
| EP | 1057988 A2 | 6/2000 |
| EP | 1832738 A2 | 9/2007 |
| JP | 2004231296 A | 8/2004 |
| JP | 2004277016 A | 10/2004 |
| JP | 2010163901 A | 7/2010 |
| WO | 2011007121 A2 | 1/2011 |
| WO | 2017014976 A1 | 1/2017 |

OTHER PUBLICATIONS

U.S. Office Action pertaining to U.S. Appl. No. 15/885,084 dated Jan. 2, 2019, 20 pages.

International Search Report and Written Opinion dated Jan. 18, 2019 pertaining to International application No. PCT/US2018/052339 filed Sep. 24, 2018.

Non-Final Office Action dated Nov. 2, 2018, pertaining to U.S. Appl. No. 15/475,383, 42 pages.

International Search Report and Written Opinion pertaining to International Application PCT/US2018/023962 dated Aug. 6, 2018.

International Search Report and Written Opinion dated May 6, 2019 pertaining to International application No. PCT/US2019/015330 filed Jan. 28, 2019.

Notice of Allowance dated Apr. 11, 2019 pertaining to U.S. Appl. No. 15/885,084 filed Jan. 31, 2018, 13 pgs.

Notice of Allowance dated May 1, 2019 pertaining to U.S. Appl. No. 15/939,971, filed Mar. 29, 2018, 32 pgs.

Notice of Allowance dated Mar. 11, 2019 pertaining to U.S. Appl. No. 15/475,383 filed Mar. 31, 2017, 23 pgs.

Notice of Allowability dated May 13, 2019 pertaining to U.S. Appl. No. 15/475,383 filed Mar. 31, 2017, 7 pgs.

International Search Report and Written Opinion dated May 15, 2019 pertaining to International application No. PCT/US2019/015349 filed Jan. 28, 2019, 13 pgs.

International Search Report and Written Opinion dated Jun. 26, 2019 pertaining to International application No. PCT/US2019/021987 filed Mar. 13, 2019.

\* cited by examiner

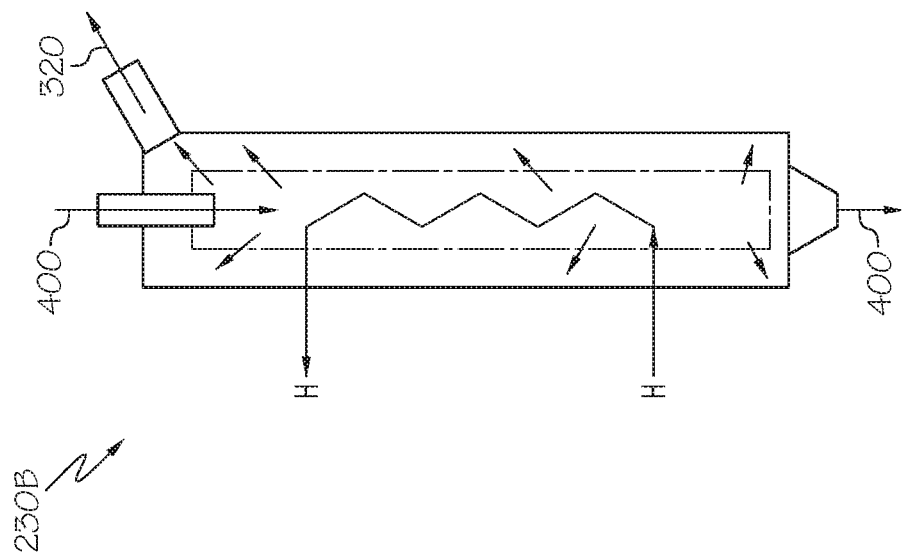
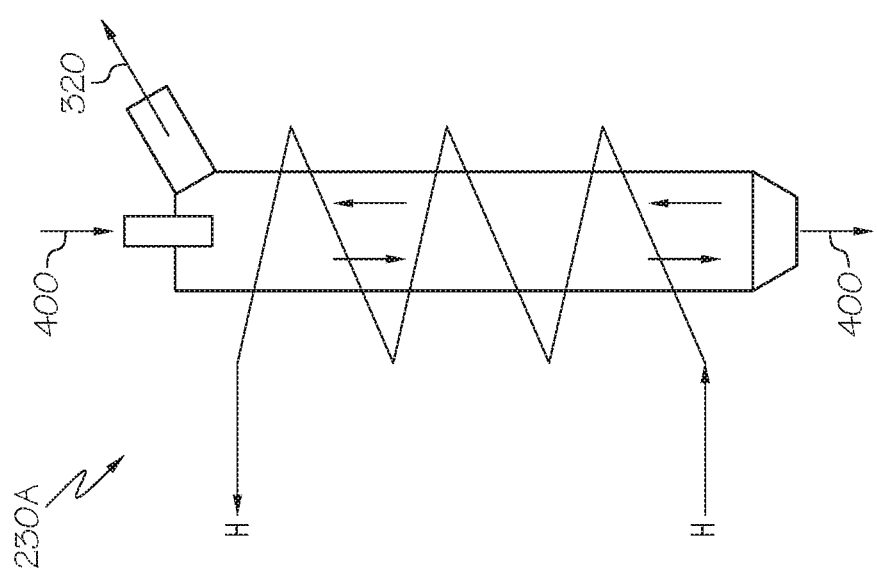

ADSORBENT CIRCULATION FOR ONBOARD OCTANE ON-DEMAND AND CETANE ON-DEMAND

BACKGROUND

The present disclosure relates generally to a vehicular fuel system for selectively separating an onboard fuel into octane-rich and cetane-rich components, and more particularly to such a system that uses a fluid-circulated adsorbent to promote such fuel separating activities.

SUMMARY

Within the realm of internal combustion engines (ICEs) used for vehicular propulsion, it is the four-cycle variant (with its intake, compression, combustion and exhaust strokes) that is most commonly in use, where the combustion is typically achieved through either a spark ignition (SI) mode or compression ignition (CI) mode of operation. In SI-based modes, a mixture of air and fuel (typically octane-rich gasoline) is introduced into a combustion chamber for compression and subsequent ignition via spark plug. In CI-based modes, fuel (typically cetane-rich diesel fuel) is introduced into the combustion chamber where the air is already present in a highly compressed form such that the elevated temperature within the chamber that accompanies the increased pressure causes the fuel to auto-ignite. Of the two, the CI mode tends to operate with greater efficiency, while the SI mode tends to operate with lower emissions.

Various engine concepts or configurations may mimic the relatively low emissions of an SI mode of operation while simultaneously satisfying the high efficiency operation of a CI mode of operation. Such concepts go by various names, and include gasoline direct injection compression ignition (GDCI), homogenous charge compression ignition (HCCI), reactivity controlled compression ignition (RCCI), as well as others. In one form, a single fuel may be used, while in others, multiple fuels of differing reactivities, usually in the form of selective octane-enrichment or cetane-enrichment, may be introduced. While performing octane on demand (OOD) or cetane on demand (COD) as a way of fueling these engines is possible, such activities may be fraught with problems. For example, having the respective octane-enriched or cetane-enriched portions be in either pre-separated form involves the parallel use of at least two onboard storage tanks and associated delivery conduit. In addition, the time and complexity associated with vehicle refueling activity in this circumstance renders the possibility of operator error significant. Likewise, OOD or COD generation once the single market fuel is already onboard may require distillation or membrane-based permeation-evaporation (pervaporation) activities that are accompanied by significant increases in size, weight and overall complexity of the onboard fuel-reforming infrastructure. These difficulties are particularly acute as they relate to achieving a heat balance associated with the underlying fuel enrichment activities. As such, a simplified approach to integrating such infrastructure into an onboard fuel separation system is warranted.

According to one embodiment of the present disclosure, a vehicular propulsion system is disclosed. The propulsion system includes an ICE with a combustion chamber, as well as a fuel system for converting an onboard fuel into octane-rich and cetane-rich fuel components. The fuel system includes an onboard source of market fuel in the form of a fuel supply tank (also referred to as an onboard fuel tank, main tank or the like), as well as a source of flowable adsorbent in the form of a top tank that along with other fluidly connected containers accept and deliver a flowable form of adsorbent. These sources are fluidly coupled to a separation unit such that both the market fuel and the adsorbent may be separately introduced into the separation unit through suitable conduit. The fuel system operates in that upon receipt of at least a portion of fuel and adsorbent from their respective onboard sources, the separation unit conveys one or more of an adsorbate, a remainder and any residual market fuel to the top tank that makes up the onboard source of adsorbent. In this condition one of the adsorbate and the remainder is in an octane-enhanced (that is to say, octane-rich) state while the other of the remainder and adsorbate is in a cetane-enhanced (that is to say, cetane-rich) state such that a first one of an octane enriched or cetane enriched fuel is produced. Moreover, a heat exchanger is used to selectively deliver heat to the saturated adsorbate that is conveyed from the top tank that makes up the source of adsorbent in order to desorb at least a portion of such saturated adsorbate such that a second one of a cetane or octane enriched fuel component may be produced and stored in a second tank. A controller and one or more sensors cooperate with one or more of the other components of the fuel system in order to acquire operational parameters or other indicia associated with the internal combustion engine and the fuel system. In this way, the controller is cooperative with the conduit such that it may make a determination that a signal received from at least one of the sensors indicates that the adsorbent is in the saturated state. In this condition, the controller and conduit may selectively convey at least some of the saturated state adsorbent from the top tank to the heat exchanger in order to produce the desorbate and regenerated adsorbent. In addition, the controller and conduit may selectively convey at least a portion of the desorbate to at least one of the combustion chamber and the second tank, as well as selectively convey at least a portion of the market fuel to be mixed, blended or otherwise combined with the desorbate in order to produce a second enriched fuel that may be conveyed to the combustion chamber. Thus, in operation, the controller and conduit may cooperate to selectively convey at least one of the market fuel, the first enriched fuel and the second enriched fuel to the combustion chamber.

According to another embodiment of the present disclosure, a vehicular fuel system for converting a market fuel into octane-rich and cetane-rich components is disclosed. The fuel system includes a source of fuel, a source of adsorbent, a separation unit and a heat exchanger that may be arranged relative to one another in a manner similar to that of the previous embodiment. In addition, conduit is included that is configured to deliver at least one of the market fuel and the first and second enriched fuels between at least one of the source of fuel, source of adsorbent, separation unit, heat exchanger and combustion chamber of an ICE.

According to yet another embodiment of the present disclosure, a method of delivering at least one of an onboard-generated octane-rich fuel and an onboard-generated cetane-rich fuel to an ICE through a fuel system comprising an onboard fuel supply tank, an adsorbent top tank, a bottom tank, a separation unit, a heat exchanger, a plurality of sensors, a controller and conduit configured to selectively fluidly couple at least the onboard fuel supply tank, top tank, bottom tank, separation unit and heat exchanger. The method includes placing the onboard fuel supply tank and top tank in selective fluid communication with the separation unit, arranging the separation unit such that upon receipt of a quantity of the market fuel from the onboard fuel supply tank and a quantity of the adsorbent from the top tank, the separation unit generates an adsorbate and a remainder at least a portion of both of which are conveyed along with any residual quantity of the market fuel between the separation unit and the top tank, wherein the remainder defines a first enriched fuel that has one of an increased octane number fuel and increased cetane number fuel relative to the market fuel, placing the bottom tank in selective fluid communication with at least one of the separation unit and the top tank, placing the heat exchanger in thermal communication with the internal combustion engine, receiving, by at least one of the plurality of sensors, indicia of whether the adsorbent that is present within the top tank is in a saturated state or an unsaturated state, determining whether a signal received from the at least one of the sensors indicates that the adsorbent is in the saturated state, sending an instruction to the conduit to convey at least a portion of the saturated state adsorbent from the top tank to the heat exchanger in order to produce a desorbate and a regenerated adsorbent, conveying at least a portion of the desorbate to at least one of the combustion chamber and the bottom tank, producing another of an increased CN fuel and increased RON fuel relative to the market fuel by combining at least a portion of the market fuel and the desorbate in the bottom tank, and conveying at least one of the market fuel, the increased RON fuel and the increased CN fuel to the ICE.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 6A and 6B illustrate two exemplary forms of heat exchange mechanism that may be used in accordance with one or more embodiments shown or described.

DETAILED DESCRIPTION

In the present disclosure, an adsorption-based separation system may be used to split an onboard market fuel into OOD or COD streams by taking advantage of one of two specific mechanisms: (1) employing differing functional groups that attract specific adsorbates (such as aromatics, cyclic and optional oxygenates) that are present in the onboard fuel supply; and (2) using a molecular sieve to selectively pass certain smaller (that is to say, linear) molecules while retaining larger (that is to say, branched) ones. Examples of the first type of adsorbent include activated carbon, silica, and alumina, as well as some types of zeolites and functionalized porous material in general, while examples of the second type include zeolites, metal organic frameworks and structured porous material. Within the present context, a fuel is deemed to be octane-rich when it has a concentration of octane ($C_8H_{18}$) or related anti-knocking agent that is greater than that of the readily-available market fuel from which one or more separation activities have been employed. By way of example, a fuel would be considered to be octane-rich if it had a research octane number (RON) of greater than about 91-92 or an anti-knock index (AKI) of greater than about 85-87 for a so-called regular grade unleaded fuel, with respectively slightly higher values for mid-grade unleaded fuel and premium unleaded fuel. Likewise, it will be understood that there are regional variations in the values of RON, AKI or other octane or cetane indicia, and that the ones expressly discussed in the previous sentence contemplate a United States market. Nevertheless, such values will be understood to be suitably adjusted to take into consideration these regional variations, and that all such values are deemed to be within the scope of the present disclosure within their respective region, country or related jurisdiction. As with octane, a fuel is deemed to be cetane-rich when it has a concentration of cetane ($C_{16}H_{34}$) that is greater than that of readily-available market fuels. By way of example, a fuel would be considered to be cetane-rich if it had a cetane number (CN) of greater than about 40-45 (for most of the United States market, with suitable variations elsewhere). The octane-rich fuel components and the cetane-rich fuel components are those that as a result of the operation of the adsorption-based separation system lead to a respective increase of the RON or CN of the market fuel that is being delivered to the ICE in general and the combustion chamber in particular.

Figure 1:
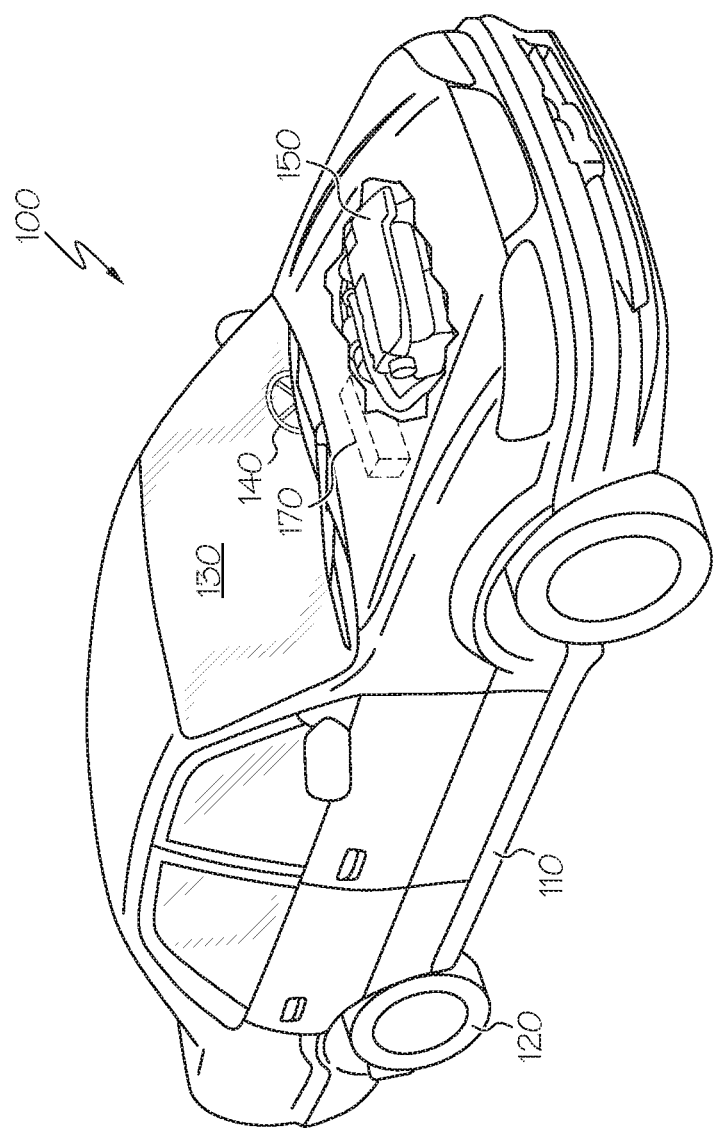
FIG. 1 shows a vehicle with a partial cutaway view of an engine in accordance with one or more embodiments shown or described.

Referring first to FIG. 1, a vehicle 100 includes a chassis 110 with a plurality of wheels 120. Chassis 110 may either be of body-on-frame or unibody construction, and both configurations are deemed to be within the scope of the present disclosure. The passenger compartment 130 is formed inside the chassis 110 and serves not only as a place to transport passengers and cargo, but also as a place from which a driver may operate vehicle 100. A guidance apparatus (which may include, among other things, steering wheel, accelerator, brakes or the like) 140 is used in cooperation with the chassis 110 and wheels 120 and other systems to control movement of the vehicle 100. An ICE 150 is situated within an engine compartment in or on the chassis 110 to provide propulsive power to the vehicle 100 while a controller 170 interacts with ICE 150 to provide instructions for the latter's operation.

Figure 2:
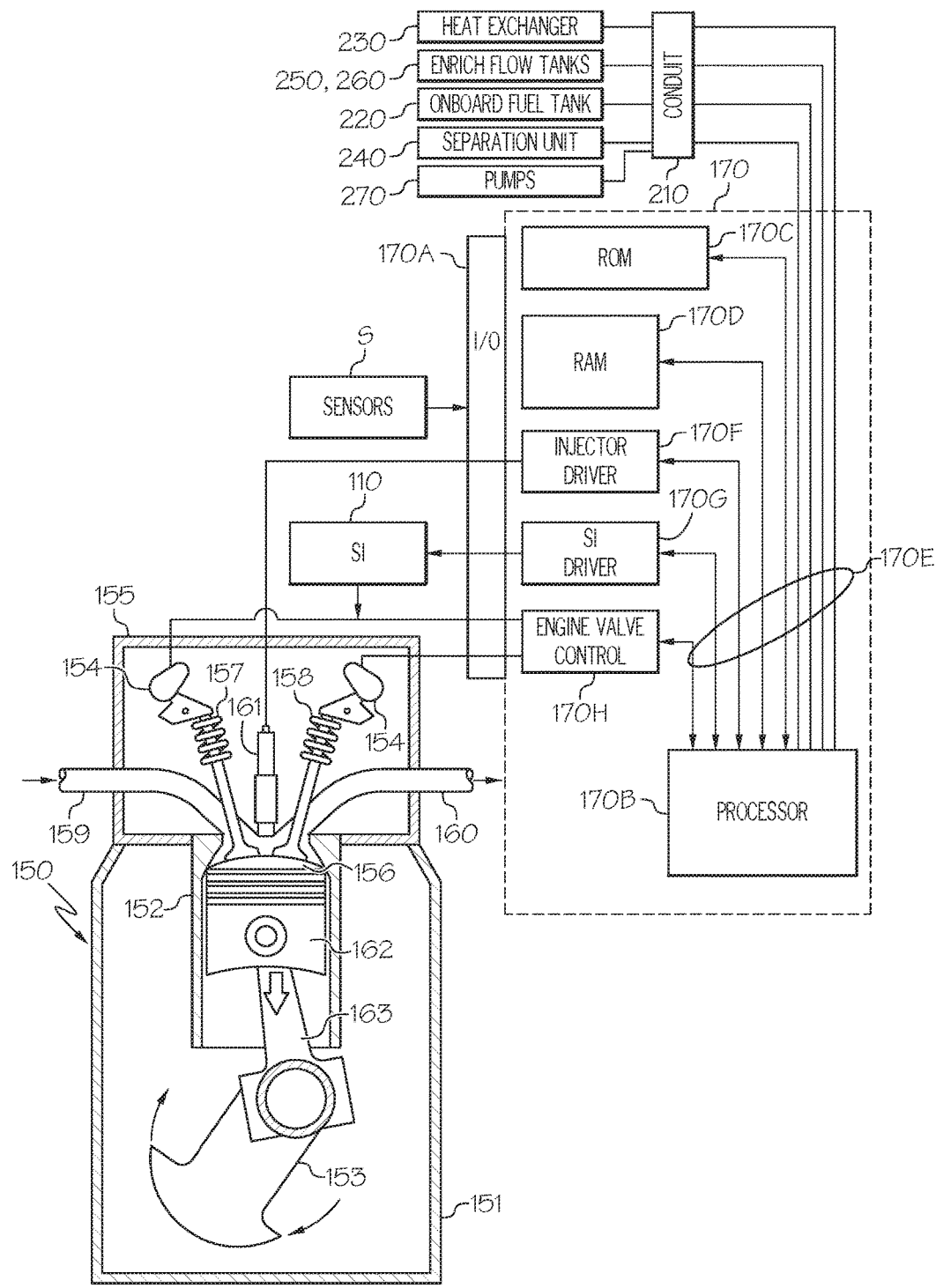
FIG. 2 shows a simplified cutaway view of a cylinder of the engine of FIG. 1 along with a controller in accordance with one or more embodiments shown or described.
Figure 3:
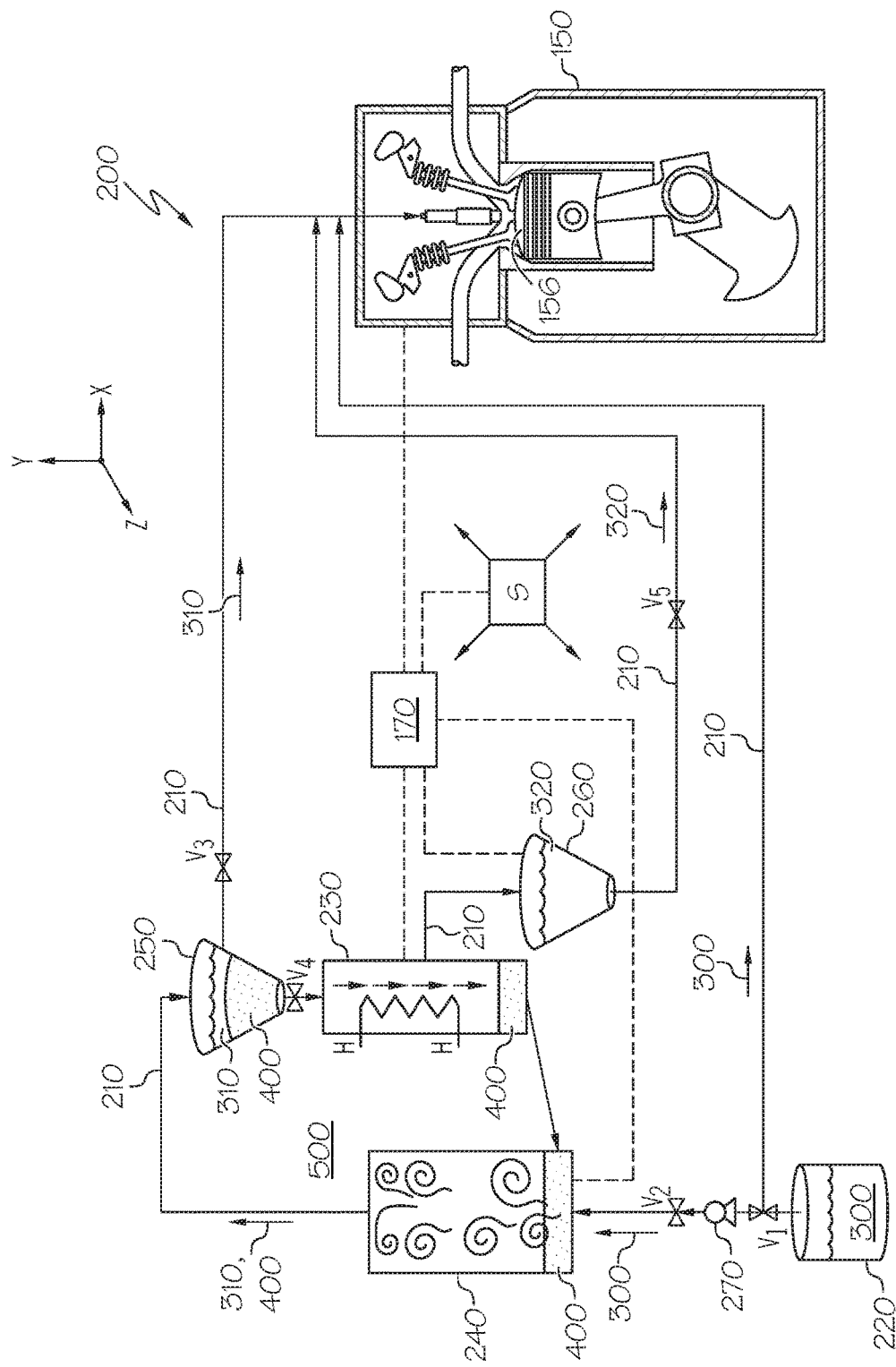
FIG. 3 illustrates a simplified view of a fuel separation system in accordance with one or more embodiments shown or described.

Referring next to FIGS. 2 and 3, details associated with the structure and operation of a portion of the ICE 150 and the controller 170 are shown. The ICE 150 includes an engine block 151 with numerous cylinders 152, a crankshaft 153 rotatably movable within the engine block 151, numerous cams 154 responsive to movement of the crankshaft 153, a head 155 coupled to the engine block 151 to define numerous combustion chambers 156. The head 155 includes inlet valves 157 and exhaust valves 158 (only one of each is shown) that in one form may be spring-biased to move in response to the crankshaft 153 through a corresponding one of the cams 154 that are controlled by either a crankshaft-driven chain, crankshaft-actuated pushrods or pneumatic actuators (none of which are shown). An air inlet 159 and an exhaust gas outlet 160 are in selective fluid communication with each of the combustion chambers 156 through a fuel injector 161, while a piston 162 is received in each respective cylinder 152 and coupled to the crankshaft 153 through a connecting rod 163 so that the reciprocating movement of the piston 162 in response to an SI or CI combustion taking place within the combustion chamber 156 is converted by the pivoting movement of the connecting rod 163 and crankshaft 153 to rotational movement of the crankshaft 153 for subsequent power delivery to the rest of a powertrain that is made up of the ICE 150 and transmission, axles, differentials (none of which are shown) and wheels 120. Although ICE 150 is shown without a spark ignition device (such as a spark plug) in a manner consistent with the various CI-based engine configurations (such as RCCI, HCCI or the like), it will be understood that in certain operating loads or conditions such as low loads, cold starts and associated warm-ups, such a spark ignition may be used (possibly in conjunction with some throttling) to increase the flame propagation combustion rate while keeping lower cylinder pressures.

In one form, ICE 150 is configured as a gasoline compression ignition (GCI) engine that can be operated with a gasoline-based fuel that is provided onboard. In such case, the presently-disclosed fuel system may be used to achieve COD through operation on various fuels, including market gasoline, gasoline without an oxygenate or related anti-knock compound (also referred to as base gasoline) or gasoline with one of the many types of alkyls, aromatics or alcohols. In one non-limiting example, such fuel may have a boiling temperature in the range of ambient to about 200° C. Unlike an SI mode of operation where the fuel is substantially injected during the four-cycle operation's inlet stroke, a GCI mode substantially injects the fuel during the compression stroke. In one form, the fuel and air are not fully mixed, which permits phasing of the combustion process to be controlled by the injection process. Moreover, the ignition delay permitted by gasoline-based fuels versus diesel-based fuels will allow for the partially premixed fuel and air to become more mixed during compression, which in turn will leave to improvements in combustion. Gasoline-based market fuels with some amount of fuel and air premixing helps ensure suitable fuel-air equivalence ratios for various engine loads and associated fuel injection timing scenarios. Thus, when configured as a GCI engine, ICE 150 using a fuel in the gasoline autoignition range (where for example, the RON is greater than about 60 and the CN is less than about 30) can provide relatively long ignition delay times compared to conventional diesel fuels. This in turn can lead to improved fuel-air mixing and related engine efficiency, along with lower soot and NOx formation; this latter improvement leads in turn to a simplified exhaust gas treatment system since the emphasis is now on oxidizing hydrocarbons and carbon monoxide in an oxygen-rich environment rather than trying to simultaneously control NOx and soot. Moreover, when operated as a GCI engine, ICE 150 requires lower fuel injection pressures than diesel-based CI engines.

Furthermore, when configured as a GCI engine, ICE 150 may take advantage of gasoline-based market fuels that require lower amounts of processing; in one form, the fuel may be in the form of gasoline with an intermediate RON of between about 70 and 85. Such octane concentrations could then be adjusted via OOD or COD through the operation of the fuel system 200 that is discussed in more detail elsewhere in this disclosure.

Moreover, unlike HCCI modes of operation where the fuel and air is fully premixed prior to introduction into the combustion chamber 156, the GCI embodiment of ICE 150 will permit CI operation under higher engine loads and compression ratios without concern over engine knocking. Furthermore, by permitting in-cycle control of the combustion phasing, an ICE 150 configured as a GCI can take advantage of fuel injection timing in order to make it easier to control the combustion process compared to an HCCI configuration where the combination of temperature and pressure inside the cylinder may not be precisely known.

In another form, ICE 150 is configured as an SI engine that can be operated with a gasoline-based fuel that is provided onboard. In this case, the presently-disclosed fuel system may be used to achieve OOD through operation on various fuels, including market gasoline, gasoline without an oxygenate or related anti-knock compound or gasoline with one of the many types of alkyls, aromatics or alcohols.

Controller 170 is used to receive data from sensors S and provide logic-based instructions to the various parts of the fuel system 200 that will be discussed in more detail below. As will be appreciated by those skilled in the art, controller 170 may be a singular unit such as shown notionally in FIGS. 1 and 2, or one of a distributed set of units throughout the vehicle 100. In one configuration, controller 170 may be configured to have a more discrete set of operational capabilities associated with a smaller number of component functions such as those associated solely with the operation of the fuel system 200. In such a configuration associated with only performing functions related to operation of the fuel system 200, the controller 170 may be configured as an application-specific integrated circuit (ASIC). In another configuration, controller 170 may have a more comprehensive capability such that it acts to control a larger number of components, such as the ICE 150, either in conjunction with or separately from the fuel system 200. In this configuration, the controller 170 may be embodied as one or more electronic control units (ECUs). It will be appreciated that ASICs, ECUs and their variants, regardless of the construction and range of functions performed by the controller 170, are deemed to be within the scope of the present disclosure.

In one form, controller 170 is provided with one or more input/output (I/O) 170A, microprocessor or central processing unit (CPU) 170B, read-only memory (ROM) 170C, random-access memory (RAM) 170D, which are respectively connected by a bus 170E to provide connectivity for a logic circuit for the receipt of signal-based data, as well as the sending of commands or related instructions to one or more of the components within ICE 150, one or more components within fuel system 200, as well as other components within vehicle 100 that are responsive to signal-based instructions. Various algorithms and related control logic may be stored in the ROM 170C or RAM 170D in manners known to those skilled in the art. Such control logic may be embodied in a preprogrammed algorithm or related program code that can be operated on by controller 170 and then conveyed via I/O 170A to the fuel system 200. In one form of I/O 170A, signals from the various sensors S are exchanged with controller 170. Sensors S may comprise level sensors, pressure sensors, temperature sensors, optical sensors, acoustic sensors, infrared sensors, microwave sensors, timers or other sensors known in the art for receiving one or more parameters associated with the operation of ICE 150, fuel system 200 and related vehicular components. Although not shown, controller 170 may be coupled to other operability components for vehicle 100, including those associated with movement and stability control operations, while additional wiring such as that associated with a controller area network (CAN) bus (which may cooperate with or otherwise be formed as part of bus 170E) may also be included in situations where controller 170 is formed from various distributed units.

In situations where the controller 170 is configured to provide control to more than just the fuel system 200 (for example, to the operation of one or more of the ICE 150 or other systems within vehicle 100), other such signals from additional sensors S may also be signally provided to controller 170 for suitable processing by the control logic; one such example may include those signals where combustion data from the ICE 150 is provided for control over the mixing or related delivery of the fuel and air. Likewise, in a manner consistent with various modes of ICE 150 operation, controller 170 may be programmed with drivers for various components within ICE 150, including a fuel injector driver 170F, a spark plug driver (for SI modes of operation) 170G, engine valve control 170H and others (not shown) that can be used to help provide the various forms of fuel introduction to the combustion chamber 156, including those associated with a multiple-late-injection, stratified-mixture, low-temperature combustion (LTC) process as a way to promote smooth operation and low NOx emissions of ICE 150 over a substantial entirety of its load-speed range. Within the present context, load-speed mapping of ICE 150 may be used to identify operating regions such as those used during cold starts and ICE 150 warm-up, low ICE 150 loads, medium ICE 150 loads and high ICE 150 loads, where correspondingly lower amounts of exhaust gas re-breathing takes place through manipulating the overlap of the inlet valve 157 relative to the exhaust valve 158, possibly in conjunction with other approaches such as exhaust gas recirculation (EGR) to help provide one or more of combustion control, exhaust gas emission reductions, or other operability tailoring for ICE 150.

In particular, controller 170 is useful in promoting customizable fuel injection and subsequent combustion strategies for various engine configurations where a CI mode of operation is used. For example, when used in conjunction with a GCI-based mode, the controller 170 may instruct the fuel to be injected in a staged manner late in the compression phase of the engine's four-cycle operation. In this way, the fuel charge may be thought of as having both locally stoichiometric and globally stratified properties. Significantly, because an octane-rich fuel (for example, gasoline) has a higher volatility and longer ignition delay relative to a cetane-rich fuel (for example, diesel), by introducing the octane-rich fuel into the combustion chamber 156 relatively late in the compression stroke and taking advantage of the fuel's inherent ignition delay (which helps to promote additional fuel-air mixing), combustion does not commence until after the end of the injection. To achieve a desirable degree of stratification, multiple injections may be used. By operating under the LTC conditions that are associated with stratified fuel combustion, a GCI mode of operation can have significantly reduced NOx production and soot emissions while achieving diesel-like thermal efficiencies. Moreover, such an approach permits the vehicle 100 to use an onboard market fuel with a lower octane than would otherwise be used. This is beneficial in that such fuel requires a smaller amount of processing than conventional gasoline and diesel fuels; this in turn reduces the entire well-to-tank emissions of other undesirable substances, such as $CO_2$.

In addition to a GCI mode of operation, such instructions as provided by controller 170 are particularly beneficial for the multiple-late injection strategy used for the delivery of fuel in HCCI, RCCI or related modes of operation of ICE 150, as such delivery is optimized when it coincides with various sequences in the compression stroke that can be measured by sensors S as they detect crank angle degree (CAD) values from the crankshaft 153 to help control when autoignition occurs. Within the present context, the position of the piston 162 within the cylinder 152 is typically described with reference to CAD before or after the top dead center (TDC) position of piston 162. The controller 170 may also base such delivery strategies on other ICE 150 operating parameters such as the previously-mentioned load and engine speed, as well as the number of times such injection is contemplated. For example, CAD from 0° to 180° corresponds to the power stroke, with 0° representing TDC and 180° representing bottom dead center (BDC). Likewise, CAD from 180° to 360° represents an exhaust stroke with the latter representing TDC. Moreover, CAD from 360° to 540° represents an intake stroke with BDC at the latter. Furthermore, CAD from 540° to 720° represents a compression stroke with TDC at the latter. By way of example, the controller 170—when used in a 6-cylinder engine—would have ignition taking place every 120° of crankshaft 153 rotation, that is to say three ignitions per every revolution of ICE 150. Thus, when ignition has taken place each of the six cylinders one time, the crankshaft 153 has rotated twice to traverse 720° of rotary movement. Likewise, if ICE 150 were configured as a 4-cylinder engine, the ignition would take place every 180° of crankshaft 153 rotation. In one form, one of the sensors S may be a crank sensor to monitor the position or rotational speed of the crankshaft 153. The data acquired from such a crank sensor is routed to the controller 170 for processing in order to determine fuel injection timing and other ICE 150 parameters, including ignition timing for those circumstances (such as cold startup, and the ensuing warm-up) where a spark ignition device is being used. Sensors S such as the crank sensor may be used in combination with other sensors S (such as those associated with inlet and exhaust valve 157, 158 position) to monitor the relationship between the inlet and exhaust valves 157, 158 and pistons 162 in ICE 150 configurations with variable valve timing. Such timing is useful in CI modes of operation of ICE 150 in that it can close the exhaust valves 158 earlier in the exhaust stroke while closing the inlet valves 157 earlier in the intake stroke; such operation as implemented by controller 170 can be used to adjust the effective compression ratio of ICE 150 in order to obtain the required temperature and pressure associated with CI combustion.

With regard to the use of OOD or COD for a CI engine in general and a multi-fuel CI engine in particular, the fuel may be formed as a hybrid of a main fuel (for example, gasoline or other low-cetane variant) and an igniter fuel (for example, diesel or other high-cetane variant), where the location, frequency and timing of introduction of each varies by concept or configuration such as those discussed previously. For example, in one concept, a single high-octane fuel is introduced via direct injection during a compression stroke. In such case, the injection of the fuel takes places at a time relatively retarded from conventional diesel injection timing to ensure adequate mixing. Since the overall combustion process is dominated by reactivity-controlled LTC, the resulting NOx and soot exhaust emissions tend to be very low. In another case, a single igniter fuel is introduced via direct injection during the compression stroke in order to promote cold-start and high-load operation where the overall combustion process is dominated by diffusion-controlled mixing of the fuel at or near the piston 162 TDC movement. In still another case, a dual injection regime introduces the main fuel via port fuel injection early in the compression stroke such that it is fully mixed with a fresh air charge during the intake stroke, after which the igniter fuel is introduced via direct injection as a way to control ignitability such that the overall combustion process is dominated by the spatially well-mixed high-octane fuel after the ignition of high-cetane fuel. As with the first case mentioned previously, such operation produces low NOx and soot emissions, due at least in part to an overall lean mixture. In yet another case, the main fuel is introduced via direct injection during the compression stroke, while the igniter fuel is introduced via direct injection near TDC to enable the ignition control; in this way, it provides a relatively robust mixture via improved thermal or spatial stratification. This in turn leads to low hydrocarbon, NOx and soot formation, at least for relatively low engine loads.

In one form, a bypass form of delivery of the market fuel 300 may be used for intermittent circumstances associated with various ICE 150 operating environments (such as cold starts, or where one or both of the top and bottom tanks may be empty) such that at least a fraction of the market fuel from the onboard fuel supply tank 220 is provided directly to the combustion chamber 156 without entering the separation unit 240. This bypass operation may be established by controller 170 to help promote a continuous supply of fuel to ICE 150, where such continuity is particularly useful under these intermittent operating conditions. In particular, the controller 170 may be used to manipulate various fuel delivery parameters, such as coolant temperature, exhaust gas temperature, level of separated fuels, delivery timing or the like for such transient operating situations. This helps promote wider operating ranges reactivity differences between the high-octane and high-cetane fuel components such as those associated with first and second enriched fuels 310, 320 that are generated by fuel system 200, especially with regard to reducing NOx or soot emissions over a much wider range, thereby reducing the likelihood of having to make a soot/NOx tradeoff. Likewise, if such intermittent operating conditions dictate that ICE 150 should be run in an SI mode, the controller 170 may be used to ensure adequate spark timing for spark ignition 110, such as through suitable logic built into the SI driver 170G as shown.

In addition, the bypass avoids otherwise undesirable latency periods associated with sudden driving conditions associated with speed or load, as well as those related to weather conditions. In such a bypass condition, the controller 170 may cooperate with the conduit 210 in order to instruct a fraction of the market fuel 300 from fuel supply tank 220 to be supplied directly to the combustion chamber 156. Two examples are presented to highlight the benefits associated with bypass operation that takes place when the operating environment of the ICE 150 has neither sufficient excess heat with which to drive a desorption process in a heat exchanger 230 nor sufficient reserves of readily-available cetane-rich fuel components or octane-rich fuel components within respective top and bottom tanks 250, 260. In a first example, during startup of ICE 150 when no heat is available to operate adsorption cycle, the controller 170 works together so that fuel flow may partially come from the top and bottom tanks 250, 260, while the main fuel portion comes from the onboard fuel supply tank 220. In a second example, if either of the top and bottom tanks 250, 260 is empty at any time (such as that associated with unexpected driving cycle conditions, lack of heating needed for desorption or insufficient air cooling), the controller 170 may likewise instruct one or more fuel pumps 270 to pressurize the market fuel being delivered from the onboard fuel supply tank 220 directly to the combustion chamber 156 as a way to at least partially bypass the separation unit 240 to compensate for the shortage in the high-cetane top tank 250 or the high-octane bottom tank 260. In situations where both cold engine conditions and low top and bottom tank 250, 260 levels are present, the bypass may be complete rather than partial, and may accompany an SI or conventional diesel-based CI mode of operation as well.

Significantly, the fuel system 200 is designed to avoid using supplemental equipment, instead utilizing components that are already operating for other purposes, such as the conduit 210 for processed fuel storage, a fan (not shown) that moves ambient air for cooling during the adsorption step, and the one or more fuel pumps 270 (although even equipment like this may be reduced, simplified or eliminated in situations where common rail fuel injection may be used). As will be mentioned in more detail, the fuel system 200 takes significant advantage of latent heat associated with normal ICE 150 operation to perform its vaporization (that is to say, desorption) activities in the separation unit 240.

In one form, adsorbent 400 used for the reaction chamber of the separation unit 240 is configured as having one or more functional groups presenting on the surface of the sorbent material. In another form, the adsorbent 400 may exhibit size-selective attributes such that it separates adsorbates by their molecular shape. Stated another way, the solid sorbent particles can act in two mechanisms, where in a first, the adsorbent 400 is selected to have functionality-base attributes that attract specific molecules such as aromatics, cyclic and (if present) oxygenates. The linear and slightly branched molecules (which may include cetane) and which do not have a high affinity for such functionality are not adsorbed and pass through the pores of the adsorbent 400 particles that are circulating in the reaction chamber of the separation unit 240. For example, if the functionality of the adsorbent 400 were such that it separated linear or slightly branched alkanes from aromatics, cyclic and highly branched alkanes by having an affinity for the latter, the adsorbate would be high in octane content while the remainder of the reacted market fuel 300 would be cetane-rich. The second mechanism is based on the difference in the molecule sizes such that linear molecules (such as n-alkanes) may pass through the relatively porous material while other molecules which have a larger dynamic diameter are hindered from passing through most pores to accumulate elsewhere in the adsorption-based reaction chamber. Examples of the first type of sorbents include: activated carbon, silica, and alumina based sorbents as well as some types of zeolites and functionalized porous material in general. Likewise, zeolites, metal organic frameworks and structured porous material may be made to act according to the second mechanism. Thus, whereas gasoline has relatively small aromatics with single benzene rings (such as benzene, toluene and xylene), diesel fuel has larger aromatics including naphthalene and its derivatives. The adsorbent 400 particles useful in the reaction chamber may be selected with a high affinity for these components specifically. In one form, increasing the molecular weight or specific surface area (that is to say, the total surface area of a given substance per unit mass, for example, in $m^2/g$) can be used to selectively adsorb one or the other of a desirable component within the market fuel 300, and all such variants are deemed to be within the scope of the present disclosure. For example, these properties may be tailored to adsorb low boiling point straight alkanes as a way to produce a cetane-rich adsorbate that can act as a high ignition quality booster for the market fuel 300 in a CI mode of operation. Likewise, these properties may be tailored to adsorb aromatics as a way to produce an octane-rich adsorbate that can act as a high ignition quality booster for the market fuel 300 in an SI mode of operation. For instance, to adsorb aromatics, the adsorbent 400 particles can be mesoporous (2-50 nm diameter) activated carbon, which in turn can lead to an average recovery of about 80%. An example of the anticipated adsorption capacity of some single-ring aromatic components for activated carbon is listed in Table 1.

TABLE 1

| Component | mg/g-adsorbent |
|---|---|
| Toluene | 15 |
| Naphthalene | 45 |
| 1-methylnaphthalene | 37 |

In another form, the adsorbent 400 may be made up of more than one particle type or size in order to preferentially promote the adsorption of a desired species. Regardless of the adsorbent 400 particle choice, the performance is optimized on various factors, including the adsorbent's capacity and selectivity, the concentration ratio of the market fuel 300 (which provides indicia of the aromatics fractions), and how fast the regeneration and desorption-based removal proceeds.

The use of the controller 170 (in response to signals acquired by one or more sensors S) and conduit 210 to selectively convey adsorbent 400 and market fuel 300 is such that in one condition (that is to say, the previously-mentioned bypass condition), no use of the separation unit 240 or the adsorbent 400 is required, while in another condition (that is to say, the previously-mentioned adsorption condition), use of the separation unit 240 in order to react the adsorbent 400 with the market fuel 300 in order to adjust the CN or RON of the fuel being delivered to ICE 150 is required. With particular regard to the bypass condition, in certain operating environments of ICE 150, it may be necessary for reliable combustion to not use the separation unit 240, but to instead use conventional modes of operation such as those associated with traditional diesel-based CI or gasoline-based SI, as at startup or other scenarios there are no exhaust gases or hot radiator fluid available to heat the adsorption cycle, or where there is little or no high-cetane or high-octane fuels present in the top and bottom tanks 250, 260 that may be required for OOD or COD operation. Within the present context, this operating environment that corresponds to having neither an adequate amount of heat (such as the residual that accompanies the ICE 150 combustion process, as well as any supplemental source of heat such as that associated with an electric heater, separate combustor or the like) nor onboard supply of cetane-rich or octane-rich fuel components is referred to as the bypass condition. In the bypass condition, the controller 170 may direct the supply of fuel to be conveyed wholly or partially from the market fuel from the onboard fuel supply tank or tanks 220 directly to the combustion chamber 156 of ICE 150 so that a suitable CI or SI mode of operation may be undertaken without having to rely upon the production or use of additional octane-rich or cetane-rich fuel components as generated by the fuel system 200.

Contrarily, an operating environment that corresponds to having one or both an adequate amount of heat (such as the residual that accompanies the ICE 150 combustion process) and onboard supply of cetane-rich or octane-rich fuel components is referred to as the adsorption condition; in this latter condition, varying amounts of additional octane-rich or cetane-rich fuel components may be generated by the fuel system 200, used in the combustion process, or both. Furthermore, the fuel system 200 may employ self-automation features to allow it to adjust itself according to the driving cycle. For example, at the beginning of a driving cycle, low RON fuel may be needed; during this operational period, the controller 170 may instruct the various components that make up the conduit 210 to route the flow of market fuel 300 through the system 200 in order to leave the market fuel 300 in its substantially original (that is to say, market-based) form such that no appreciable adsorption activity is undertaken. Likewise, during such early stage of the driving cycle (and related ICE 150 operation) when the low RON fuel is being used, exhaust and other ICE 150 residual heat starts to form, at which time such heat can be used to regenerate the octane-rich adsorbate through vaporizing, as previously mentioned. Furthermore, in situations where there is sufficient exhaust heat being generated by ICE 150 operation, the absorption and regeneration will be at their full capacities; otherwise, the fuel system 200 can be made to work at a partial load using as much heat as is available to provide octane-rich and cetane-rich fuel components. In this way, the fuel stream that is being conveyed from the onboard fuel supply tank 220 is usually fed to the separation unit 240 where it is acted upon, except in those ICE 150 operating regimes where there is an inadequate amount of exhaust, residual or otherwise supplemental heat with which to promote the regeneration of adsorbed portions of such market fuel 300.

In addition to providing instructions for combustion control, emission reductions or the like, controller 170 interacts with one or more various components that make up conduit 210, including various actuators, valves (such as one or more of valves V1, V2, V3, V4 and V5 as will be discussed in more detail later in conjunction with FIG. 3) and related components to control the operation of the delivery of fuel from an onboard fuel supply tank 220, a heat exchanger 230 (that is configured as a downcomer pipe in the form of a riser) and separation unit 240 in order to effect the production of OOD or COD required to operate ICE 150 for a given set of load and related operating conditions. Likewise, in one form, controller 170 interacts with one or more tanks that are configured to contain, deliver and receive a flowable adsorbent 400 as will be discussed in more detail later. For example, in one form where one of the tanks is a top tank 250 while the other tank is a bottom tank 260, the controller 170 could manage the fuel flow from either the onboard fuel supply tank 220 or the top and bottom tanks 250, 260 to the combustion chamber 156 where the two fuels corresponding to OOD or COD are injected separately, or by blending prior to being introduced into the combustion chamber 156 at different ratios depending on load, speed and other optional parameters associated with operation of ICE 150. Furthermore, the controller 170 may manipulate one or more of the various valves V1, V2, V3, V4 and V5 and other components such that the vehicle 100 can be operated by circulating the market fuel 300 directly from the onboard fuel supply tank 220 to the ICE 150 directly in situations where the RON or CN of such fuel is compatible with the ICE 150 needs during a particular mode of engine operation.

Moreover, when SI combustion is required, the controller 170 may instruct the inlet and exhaust valves 157, 158 to reduce the compression ratio consistent with an SI mode of operation. Furthermore, the controller 170 may—depending on the need of ICE 150—provide auxiliary sparking for fuel preparation (such as the generation of free radicals in the air-fuel mixture). Sensed input (such as that from various locations within ICE 150, including CAD from the crankshaft 153, as well as those from driver-based input such as the accelerator of guidance apparatus 140) may be used to provide load indicia. Likewise, in addition to suitable adjustment of the inlet and exhaust valves 157, 158, balanced fuel delivery from each of the top and bottom tanks 250, 260 with pressurizing forces provided by one or more fuel pumps 270 may be achieved by controller 170 depending on if ICE 150 is in a CI mode or an SI mode of operation. Although there is only pump 270 shown (immediately upstream of the fuel injector 161) in an attempt to keep visual clarity within the figure, it will be appreciated that additional pumps 270 may be placed in other locations within conduit 210 in order to facilitate the flow of fuel through the fuel system 200, and that all such variants are within the scope of the present disclosure. In addition, the pressure of the market fuel 300 being introduced via fuel pump 270 can be varied, and as such may be varied by controller 170 to determine the vehicle 100 cooling demand, as well as overall fuel system 200 performance. For instance, higher injected pressures of the market fuel 300 can promote a more thorough octane-enhanced adsorption process, higher condensation temperatures or the like.

The controller 170 may be implemented using model predictive control schemes such as the supervisory model predictive control (SMPC) scheme or its variants, or such as multiple-input and multiple-output (MIMO) protocols, where inputs include numerous values associated with the various measurements that may be acquired by sensors S, as well as of estimated values (such as from the lookup tables or calculated algorithmically) or the like. In that way, an output voltage associated with the one or more sensed values from sensors S is received by the controller 170 and then digitized and compared to a predetermined table, map, matrix or algorithmic value so that based on the differences, outputs indicative of a certain operating environment for ICE 150 are generated. These outputs can be used for adjustment in the various components within the purview of the controller 170, such as the remaining components associated with fuel system 200, as well as for adjusting whether fuel delivered from the fuel system 200 to the combustion chamber 156 corresponds to a bypass condition environment of the ICE 150 or an adsorption condition environment of the ICE 150.

As mentioned above, in one form, controller 170 may be preloaded with various parameters (such as atmospheric pressure, ambient air temperature and flow rate, exhaust gas temperature and flow rate or the like) into a lookup table that can be included in ROM 170C or RAM 170D. In another form, controller 170 may include one or more equation- or formula-based algorithms that permit the processor 170B to generate a suitable logic-based control signal based on inputs from various sensors S, while in yet another form, controller 170 may include both lookup table and algorithm features to promote its monitoring and control functions. Regardless of which of these forms of data and computation interaction are employed, the controller 170—along with the associated sensors S and conduit 210—cooperate such that as an operating load on the ICE 150 varies, a suitable adjustment of the market fuel that is present in the onboard fuel supply tank 220 may be made to provide the amount of octane or cetane enrichment needed for such operating load by mixing the onboard market fuel with one or the other of the high-octane or high-cetane product fuels from the top and bottom tanks 250, 260.

One parameter of ICE 150 that may be preloaded into or generated by controller 170 to provide an indication of how ICE 150 is operating is the mean effective pressure (MEP).

In one form, MEP may be used to correlate ICE 150 operating regimes to fuel needs and the various forms of multiple-late injection strategies discussed previously for various CI mode configurations. MEP—including its variants indicated mean effective pressure (IMEP), brake mean effective pressure (BMEP) or friction mean effective pressure (FMEP)—provides a value of the ability of a particular ICE 150 to do work without regard to the number of cylinders 152 or related ICE 150 displacement. Moreover, it provides a measure of the pressure corresponding to the torque produced so that it may be thought of as the average pressure acting on a piston 162 during the different portions of its four cycles (inlet, compression, ignition and exhaust). In fact, MEP is a better parameter than torque to compare engines for design and output because of its independence from engine speed or size. As such, MEP provides a better indicator than other metrics (such as horsepower) for engines in that the torque produced is a function of MEP and displacement only, while horsepower is a function of torque and rpm. Thus, for a given displacement, a higher maximum MEP means that more torque is being generated, while for a given torque, a higher maximum MEP means that it is being achieved from a smaller ICE 150. Likewise, higher maximum MEP may be correlated to higher stresses and temperatures in the ICE 150 which in turn provide an indication of either ICE 150 life or the degree of additional structural reinforcement in ICE 150. Significantly, extensive dynamometer testing, coupled with suitable analytical predictions, permit MEP to be well-known for modern engine designs. As such, for a CI mode, MEP values of about 7.0 bar to about 9.0 bar are typical at engine speeds that correspond to maximum torque (around 3000 rpm), while for naturally aspirated (that is to say, non-turbocharged) SI modes, MEP values of about 8.5 bar to about 10.5 bar are common, while for turbocharged SI modes, the MEP might be between about 12.5 bar and about 17.0 bar.

Likewise, MEP values may be determined for various load-related operating regimes for ICE 150. Such operating regimes may include low power or load (including, for example, engine idling conditions) that in one form corresponds to a MEP of up to about 1.0 bar, in another form of an MEP of up to about 2.0 bar. Likewise, such operating regimes may include normal (or medium) power or load that is one form corresponds to a MEP of between about 2.0 bar to about 5.0 bar, in another form of an MEP of between about 2.0 bar and about 6.0 bar, in another form of an MEP of between about 2.0 bar and about 7.0 bar. Moreover, such operating regimes may include a high power or load that is one form corresponds to a MEP of about 7.0 bar and above, in another form of an MEP of about 8.0 bar and above, in another form of an MEP of about 9.0 bar and above, and in another form of an MEP of about 10.0 bar and above.

As will be understood, these and other MEP values may be input into a suitably-mapped set of parameters that may be stored in a memory accessible location (such as the lookup tables mentioned previously) so that these values may be used to adjust various ICE 150 operating parameters, as well as for the controller 170 when acting in a diagnostic capacity. In such case, it may work in conjunction with some of the sensors S, including those that can be used to measure the volume of cylinder 152 such as through crankshaft 153 angle or the like). In addition to MEP values, other operating parameters may be detected by sensors S to provide some indication of the operating regime of ICE 150; such additional parameters may include engine health monitoring through temperature measurements, pressure measurements, balance measurements, load measurements or the like.

Referring with particularity to FIG. 3, details associated with fuel system 200 that is used to provide selective onboard OOD or COD for ICE 150, while managing the heat balance that accompanies such COD and OOD operations, are shown. Significantly, by taking advantage of existing onboard fuel delivery and ICE 150 operating infrastructure, any on-vehicle cooling and heating needed to promote the various adsorbing and regenerating activities can be achieved without requiring additional equipment or efficiency-decreasing operation of the ICE 150. The fuel system 200 includes a network of pipes, tubing or related flow channels—along with various valves and pumps or related pressurization devices—that make up conduit 210 in order to convey the market fuel 300 to the ICE 150, as well as the various components within the fuel system 200 that are fluidly coupled through conduit 210, such as the onboard fuel supply tank 220, heat exchanger 230, separation unit 240, top tank 250 and bottom tank 260.

In particular, rather than relying on an adsorbent that is affixed to a rigid substrate, the fuel system 200 employs an adsorbent 400 that is in particle or granular form such that it can be made to engage in fluid-like flow through various components that are coupled by conduit 210. In this way, the adsorbent 400 may be circulated in a manner similar to an approach used in fluidized bed reactors. In one form, the particles that make up the adsorbent 400 have robust mechanical properties, including minimums in temperature capability, tensile strength, compression strength, modulus of elasticity, low density, significant voids (that is to say, porosity) and small particle sizes. Such properties help avoid the breakage of the adsorbent 400 into smaller fines that could otherwise cause clogging of various components that make up the fuel system 200. This in turn facilitates improved mass and heat transfer between the stream of market fuel 300 and the adsorbent 400, which in turn enhances the overall octane-rich and cetane-rich separation performance of the fuel system 200.

Significantly, separation unit 240 construction may be simplified in that rather than having to configure it with numerous reaction chambers—such as those used for batch processing—it may employ a single reaction chamber where the adsorptive mixing of market fuel 300 and adsorbent 400 takes place in a continuous manner such that the fuel system 200 is always adsorbing and desorbing the market fuel 300. This in turn may provide significant heating and cooling conservation compared to a batch-based system in that alternating heating and cooling steps may be eliminated or reduced, which in turn can improve the overall energy efficiency of fuel system 200. Furthermore, the adsorption efficiency can be higher as the fuel system 200 circulates the adsorbent 400 along with the market fuel 300, resulting in a more thorough contact and exchange relative to a solid-based adsorption approach. The cooperation of the controller 170 and fuel system 200 may be such that the repeated and continuous-like circulation of the market fuel 300 and adsorbent 400 particles continues until the desired degree of saturation is achieved. The controller 170 may be used to ensure that parameters such as residence time, flow rates or the like are manipulated via various methods, such as changing the injected fuel velocity, pressure or the like, to achieve the desired amount of production of an adsorbate and a remainder both of which make up a portion of the market fuel 300. While the size of the adsorption chamber depends on the needed residence time and the separation capacity, the separation unit 240 size can be kept small enough to make it practical for vehicular uses through compensating the short residence time with more circulation in order to get the same separation efficiency.

As can be seen, various valves $V_1$, $V_2$, $V_3$, $V_4$ and $V_5$ may be used to help facilitate the conveyance of the market fuel 300, first and second enriched fuels 310, 320 and saturated adsorbent 400 as needed. Although shown without dashed-line signal connections, and as is discussed elsewhere, operation of these valves (as well as others) may be through controller 170. Although five valves $V_1$, $V_2$, $V_3$, $V_4$ and $V_5$ are notionally depicted in FIG. 3, it will be appreciated that greater or fewer numbers may be incorporated into fuel system 200, and that all such variants are deemed to be within the scope of the present disclosure. Likewise, the placement of the valves $V_1$, $V_2$, $V_3$, $V_4$ and $V_5$ is shown notionally; it will be appreciated that they may be situated in any suitable location within the fuel system 200 in order to facilitate the desired fluid flows, including in or around the onboard fuel supply tank 220, heat exchanger 230, separation unit 240, top and bottom tanks 250, 260, fuel pump 270 or other components that are disposed within or otherwise coupled to conduit 210.

The following discussion in conjunction with FIG. 3 is premised on the understanding that the adsorbent 400 demonstrates an affinity for octane-rich fuel components (such as that associated with functional-based adsorbents); in such case, the adsorbate being produced and routed through the top tank 250 will be octane-rich while the remainder that is produced in the separation unit 240 and that is associated with a first enriched fuel 310 will be cetane-rich. Likewise, the remainder that is associated with a second enriched fuel 320 that is produced in the heat exchanger 230 and that is routed through the adsorbent bottom tank 260 will be further enriched with octane. It is understood that in another form where the adsorbent 400 being introduced into the separation unit 240 demonstrates an affinity for cetane-rich fuel components (such as that associated with size-selective adsorbents), the first enriched fuel 310 remainder—in the form of a filtrate—being produced in the separation unit 240 and routed through the top tank 250 will be octane-rich while the adsorbate—in the form of a retentate—will be cetane-rich. Moreover in this other form, that portion of a remainder being produced in the heat exchanger 230 and that is associated with a second enriched fuel 320 that is routed through the bottom tank 260 will be further enriched with cetane. As such, the nomenclature associated with the first enriched fuel 310 and the second enriched fuel 320 will be understood to be context-dependent, as the nature of the adsorbent 400 determines which of the first enriched fuel 310 and the second enriched fuel 320 exhibit a respective increased RON or CN relative to the market fuel 300. It will be appreciated that depending on this functionality or size-selective attributes of the adsorbent 400, a high affinity for either octane-rich fuel components or for cetane-rich fuel components is established. Thus, the top tank 250 may be configured to contain low RON fuel while the bottom tank 260 may be configured to contain high RON fuel, or vice-versa. It will likewise be appreciated that for a given quantity of market fuel 300 that is introduced into the separation unit 240 from the onboard fuel supply tank 220 (and absent a complete adsorptive reaction of the market fuel 300), at least some of the market fuel 300 may not engage in any adsorptive reaction; in such case, the relative RON and CN for that part of the unreacted market fuel 300 remains substantially identical to that of the market fuel that was originally contained within the onboard fuel supply tank 220. Within the present context, the portion of the market fuel 300 that has been introduced into the separation unit 240 but remains unreacted after exposure to the adsorbent 400 is known as a residual quantity of such market fuel 300.

In operation, the fuel system 200 starts with having some amount of the flowable absorbent 400 present within the top tank 250. In one form, the top tank 250 may define a substantially vertical and cone-shaped profile that helps better channel the more dense adsorbent 400 particles to the narrower lower end while leaving the less dense first enriched fuel 310 to the wider upper end. Similarly, in one form the bottom tank 260 may define a substantially vertical and cone-shaped profile that helps better channel the more dense adsorbent 400 particles to the narrower lower end while leaving the less dense second enriched fuel 320 to the wider upper end. As such, the top and bottom tanks 250, 260 permit at least a stratified containment of the stored fuel components for ease of separation and as-needed removal. Within the present context, it will be understood that the top and bottom tanks 250, 260 may be oriented other than vertically (such as to accommodate placement within a particular vehicle 100) as long as such non-vertical placement does not appreciably detract from the solid-liquid separation function that they perform, and that all such variations of the top and bottom tanks 250, 260 orientation are deemed to be within the scope of the present disclosure. In one form, the top and bottom tanks 250, 260 may be placed such that the top one is at a higher vertical elevation relative to the heat exchanger 230 while the second one is at a lower vertical elevation relative to the heat exchanger 230 in order to take advantage of respective gravity feeds to and from the heat exchanger 230. In another form, the top and bottom tanks 250, 260 may be placed within the fuel system 200 such that they take advantage of component placement efficiencies, especially in configurations (such as within the engine compartment of vehicle 100) where volumetric space is limited.

In vehicle 100 operational situations when market fuel 300 is sufficient to meet a given ICE 150 operating condition (that is to say, when no OOD or COD generation is required), valve $V_1$ may be deployed to route the market fuel 300 directly from the onboard fuel supply tank 220 to the ICE 150. An example of this is the previously-discussed bypass form of delivery of the market fuel 300. Contrarily, in vehicle 100 operational situations when low RON (that is to say, high cetane) fuel is needed, valve $V_2$—either alone or in conjunction with valve $V_1$—is operated to allow the passage of at least some of the market fuel 300 from the onboard fuel supply tank 220 into the adsorption chamber of the separation unit 240, where it encounters adsorbent 400 particles in an unsaturated state that have come to rest (such as under the influence of gravity) in a lower portion of the separation unit 240. Within the present context, the adsorbent 400 is considered to be unsaturated when it is still capable of capturing a measurable quantity of octane-rich fuel components where such measurable quantity may be determined by liquid level height, concentration difference or other suitable mechanisms. In one form, such introduction of the market fuel 300 may be through a pressurizing device such as pump 270. It will be appreciated that when ICE 150 is configured to have CI attributes, the need for high cetane fuel may be present for a significant portion of the driving cycle in order to take advantage of CI mode combustion efficiencies. Example scenarios where CI modes of operation and the related use of high cetane fuel include those associated with low to moderate ICE 150 loads (such as low to intermediate vehicle speeds on relatively level surfaces), especially once standard ICE 150 operating temperatures or the like have been attained.

Once inside the separation unit 240, the adsorbent 400 particles and the market fuel 300 are circulated together (such as through an agitator, not shown) in order to promote enhanced mixing, surface-area contact and consequent adsorption of the molecules of the market fuel 300 onto the surface and into the adsorbent 400 pores. As mentioned previously, in one form, by virtue of having the market fuel 300 be exposed to a functional-based adsorbent 400, the adsorbate being produced is octane-rich such that the remainder that makes up the first enriched fuel 310 is cetane-rich, while in another form where size-selective features within the adsorbent 400 are relied upon to generate the adsorbate, the remainder that makes up the first enriched fuel 310 is octane-rich. In addition, a portion of the adsorbent 400 that is introduced into the separation unit 240 may not interact with the market fuel 300 such that the particles, granules or other flowable material that makes up the adsorbent 400 may remain resident within the separation unit 240. In one form, this unreacted adsorbent 400 may be relatively dense compared to the market fuel 300 and the first enriched fuel 310, which in turn could lead to the unreacted adsorbent 400 settling in the bottom of the separation unit 240. Eventually, the portion of the adsorbent 400 that does accept the adsorbate from the market fuel 300 reaches a state where it can no longer capture any additional adsorbate; resulting in a saturated state. In the present context, the adsorbent 400 is deemed to be unsaturated (that is to say, in the unsaturated state) unless specifically identified to the contrary.

The controller 170 can work through one of the two previously-mentioned mechanisms to determine the amount of adsorbate production within the fuel system 200, particularly as it relates to the desired degree of saturation. The first mechanism with which to determine if the adsorbent 400 is in a saturated state or an unsaturated state is by liquid level height. In this mechanism, when no adsorption of the market fuel 300 molecules onto the particles of adsorbent 400 is taking place within the separation unit 240, all of the less dense market fuel 300 being introduced is made to exit out of the top of the separation unit 240 and into the top tank 250 in the manner previously discussed. This represents the highest liquid level that might be expected to occur in the top tank 250. In contrast, when there is complete adsorption (which would only take place under a hypothetical extreme case) the liquid level at the top tank 250 will be zero, as all of the market fuel 300 within the separation unit 240 is consumed in the adsorption process. While it will be appreciated that these two values represent the extreme conditions of fuel 300 level that may exist in the top tank 250, and that neither of these values would be expected to occur in an actual embodiment under normal operating conditions, they are discussed nevertheless in order to better comprehend the range of actual adsorption levels that could be expected to take place within fuel system 200. Accordingly, when there is partial adsorption of fuel 300 by the adsorbent 400 within the separation unit 240, the liquid level in the top tank 250 corresponding to such amount of adsorption can be correlated by the controller 170 that is operating in conjunction with sensors S that are placed—as well as within other locations in fuel system 200—to measure such levels taken from the top tank 250.

The second mechanism to determine the amount of adsorbate production is by concentration difference. In this mechanism, the concentration of a desired component is measured (again, by one or more sensors S) in the stream that is entering into the separation unit 240, as well as the liquid layer that is forming inside. In one form, when the concentration difference between the stream and the liquid layer is smaller than a certain value, the controller 170 will instruct valve $V_4$ to continue to recycle both the market fuel 300 and the adsorbent 400 that are conveyed from the top tank 250 to the adsorption chamber of the separation unit 240 until such time as a suitable degree of saturation is attained.

Within the present context, the sensors S are cooperative with the controller 170 such that upon determination that a sensed signal indicates that the adsorbent 400 that is present within the top tank 250 is in a saturated state, the controller 170 instructs the conduit (as represented by one or more flow-control components such as the pipes, tubing or related flow channels, pump 270 and one or more valves $V_1$, $V_2$, $V_3$, $V_4$ and $V_5$) to convey at least a portion of the saturated state adsorbent 400 from the top tank 250 to the heat exchanger 230 in order to produce the both desorbate that can be subsequently routed to the bottom tank 260 and the regenerated adsorbent 400 that can be subsequently routed to the separation unit 240. Likewise, if the sensed signal indicates that the adsorbent 400 that is present within the top tank 250 is not in a saturated state, the controller 170 instructs a recycle loop 500 portion of the conduit to continue to operate until such time as the adsorbent 400 does become sufficiently saturated. In one form, the controller 170 may determine which of the first and second adsorbate production mechanisms to use in order to establish whether a sufficient amount of adsorbent 400 saturation has taken place.

Because saturation may take place under non-elevated temperature conditions within the separation unit 240, the temperature of any adsorbent 400 particles (as well as any residual market fuel 300 or first enriched fuel 310) are relatively low. Accordingly, such low temperature may be used as part of heat exchange activities that are used to regenerate the adsorbent 400 via desorption operation in the heat exchanger 230. Thus, when saturation of the adsorbent 400 is reached, the controller 170 may adjust valve $V_4$ so that the saturated adsorbent 400 moves downward through the heat exchanger 230 where heat through heating coil H is supplied to regenerate the saturated adsorbent 400 particles substantially back into their original form by vaporizing the adsorbate. In one form, the source of heat can be residual heat that arises out of the operation of ICE 150 and that is fluidly or thermally coupled through heating coil H. Upon receipt of such heat, the adsorbate that becomes vaporized (that is to say, desorbed from the adsorbent 400) is in the form of the second enriched fuel 320; depending on the amount of heat absorbed, the second enriched fuel 320 may be in either a vapor state or a liquid state. Regardless of which state it is in, the second enriched fuel 320 leaves via an upper part of the heat exchanger 230 for containment within the bottom tank 260 and subsequent delivery to the ICE 150 through a respective portion of conduit 210. An optional chiller or condenser (not shown) may be disposed with this part of the conduit 210 to assist with the delivery of the second enriched fuel 320 that is exiting the heat exchanger 230. In another form, no condensation need take place in situations where the second enriched fuel 320 is being introduced into ICE 150 in vapor form.

Storage of the first enriched fuel 310 that is produced by the solid-liquid separation that occurs in the top tank 250 may take place within the top tank 250, as well as in a portion of the conduit 210 that is disposed between the top tank 250 and the ICE 150 until such time as it is needed by the combustion chamber 156 of ICE 150. At such time, valve $V_3$ may be opened to allow passage of the first enriched fuel 310 from the top tank 250 to the ICE 150. In another form, the upper portion (that is to say, the portion that is closer to the base than the apex) of the top tank 250 may act as storage for the first enriched fuel 310. In either form, a separate product storage tank becomes unnecessary, while ample pressure to deliver the first enriched fuel 310 may be provided through fuel pump 270. As shown, the separation unit 240, top tank 250, heat exchanger 230 and associated parts of the conduit 210 cooperate to define the recycle loop 500 for the an adsorbent 400. In one form, the circulation of the adsorbent 400 continues through the recycle loop 500 for various adsorption and desorption reactions. In one form the recycle loop 500 may include additional valves and piping, tubing or related flow-control channels (none of which are shown) to permit the adsorbent 400 to bypass one or more of the components (such as heat exchanger 230, separation unit 240 or top tank 250) during certain modes of fuel system 200 operation, such as those associated with the adsorbent 400 being in an unsaturated condition. Furthermore, the controller 170, sensors S and one or more of valves $V_1$, $V_2$, $V_3$, $V_4$ and $V_5$ can be used to dictate when various circulating and recycling activities take place, such as when a desired degree of saturation of the adsorbent 400 is attained. For example, indicia of such saturation may be obtained by sensed data from the sensors S that is in turn operated upon or otherwise interpreted through one or more logic circuits embedded within controller 170 to allow the saturated adsorbent 400 to be exposed to a regeneration action in the heat exchanger 230 and subsequent return to the bottom of the separation unit 240. In one mode of operation, the controller 170 can instruct the various valves, pumps and piping that make up conduit 210 to continue to recycle the liquid fuel 300 as well as the adsorbent 400 through recycle loop 500 using the previously-discussed concentration difference that can be sensed in top tank 250.

Likewise, storage of the second enriched fuel 320, which in one form may be made from conveying the desorbate that is produced in the heat exchanger 230, may take place in the bottom tank 260 where it may wait until such time as needed by ICE 150. In such case, the controller 170 and portions of conduit such as valve $V_5$ and either the fuel pump 270 or another pump (not shown) may be cooperative with one another to allow the bottom tank 260 to receive and deliver the second enriched fuel 320, depending on the need. Moreover, and in a manner similar to the first enriched fuel 310 that is produced by the solid-liquid separation that occurs in the top tank 250, no additional storage is needed, as the bottom tank 260 is already present within fuel system 200 to act as a storage and separation container for the second enriched fuel 320 as well as the regenerated adsorbent 400 that is conveyed from the heat exchanger 230. As mentioned previously, the production and storage of one or another of the first and second enriched fuels 310, 320 is dependent on the type of adsorbent 400 used in the fuel system 200.

As a result of the heat exchange-based regeneration step that takes place in the heat exchanger 230, the heated adsorbent 400 settles to the bottom of the heat exchanger 230, where the flowable particles can after cooling then be routed (such as by gravity feed, as shown) to the separation unit 240 as a way to provide additional improvements in overall fuel system 200 operational efficiency. Thus, through the continuous cycling of the adsorbent 400 particles between the heat exchanger 230 and the separation unit 240, the adsorbent 400 particles will always have a relatively low design temperature range, and as such will not be adding to the cooling load of vehicle 100. Of particular note is that the market fuel 300 being stored in the onboard fuel supply tank 220 may be of sufficient thermal mass to significantly contribute to the relatively low temperatures of the adsorbent 400 particles present in the separation unit 240. In one form, a closed supplemental cooling loop that includes water or other liquid coolant (neither of which are shown) may thermally cooperate with freshly-injected fuel from the onboard fuel supply tank 220 in order to control the adsorption process taking place within the separation unit 240 at temperatures that can be governed by controller 170. This may in turn help with initiation of the adsorption process at a desired (and in one form, low) temperature range.

Referring next to FIG. 6, the heat exchanger 230 of FIG. 3 is designed to promote effective regeneration of the adsorbent 400 particles through separation between them and the adsorbate. In particular, the saturated adsorbent 400 that leaves the bottom portion of the top tank 250 traverses the internal flowpath of the heat exchanger 230 to be subjected to the previously-discussed heat exchange-based operation; the heat exchanger 230 may be embodied in one of two ways as follows. The first design 230A (shown on the left side of FIG. 6) is of single tube construction, where a heating coil H provides the necessary heat to promote the desorption of the adsorbate. As discussed previously, the adsorbate temperature increases, causing it to evaporate and move upward in the manner shown due to the lower density of the vapor. The first design 230A enjoys relative simplicity of construction, and preferably uses counterflow in order to provide enhanced levels of adsorbent-based fuel separation. The second design 230B is made up of two concentric tubular chambers where the inner tube is perforated to enable the adsorbate particles of the saturated adsorbent 400 to immediately leave the tube once it is evaporated in response to the elevated temperatures that are directly introduced via heating coil H. Unlike the indirect heat associated with the single tube approach of the first design 230A, the second design 230B supplies direct heating, thereby resulting in a more efficient heat transfer owing to the lower thermal resistance associated with having no wall thermal resistance.

Figure 4:
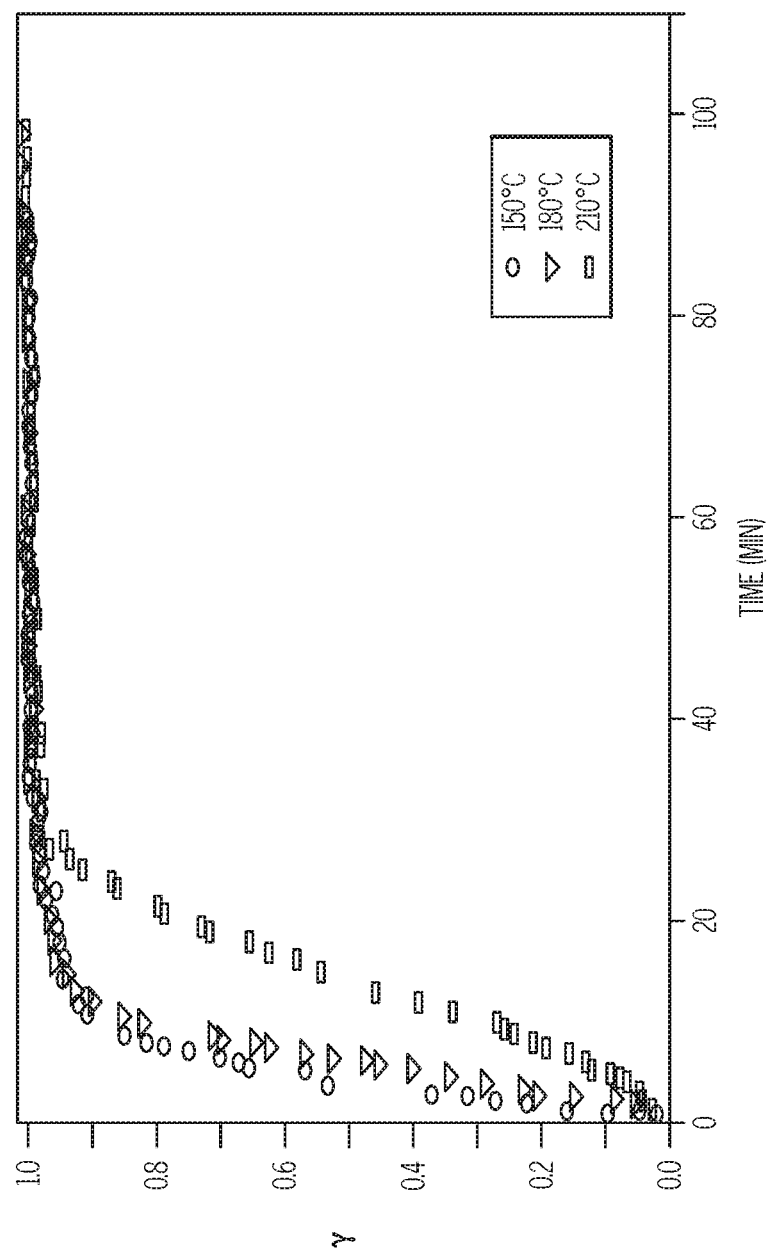
FIG. 4 illustrates an adsorption rate of a highly aromatic fuel compound on a particular adsorbent functional group that may be used in the fuel separation system of FIG. 3.

Referring next to FIG. 4, an example is provided to demonstrate the applicability of the proposed method and system with particular emphasis on small adsorbent size and fast adsorption rate $\gamma$ for three different temperatures of 150° C., 180° C. and 210° C. for a 1000 cc zeolite adsorbent sample with a Y-based framework; this size was chosen because it was deemed to be compatible with vehicular-based applications. In particular, the employed adsorbent is zeolite NaY with a geometric volume of $\alpha$-cages (0.294 cc/g) and $\beta$-cages (0.054 cc/g). The adsorption capacity of various aromatic molecules that are present in a commercially-available gasoline-based market fuel for this type of adsorbent is shown in Table 2.

TABLE 2

| Aromatic Component | Adsorption Capacity (ml/g NaY) | Adsorption Capacity (ml/cm³ NaY) |
| --- | --- | --- |
| Benzene | 0.29 | 0.4 |
| Toluene | 0.28 | 0.39 |
| m-Xylene | 0.28 | 0.39 |
| Mesitylene | 0.21 | 0.3 |
| Average | 0.265 | 0.37 |

Despite the fact that adsorption of aromatics using Y-based zeolites tends to be a relatively slow process, there is no need to wait for full equilibrium as many of the aromatic species contained within the market fuel reach a saturation level much more quickly. For example, toluene is adsorbed and reaches equilibrium within 20 minutes, with substantially complete equilibrium occurring after about 1.0 to 1.7 hours. Moreover as shown, the adsorption rate $\gamma$ increases with temperature. This permits the adsorbate rate over the adsorption cycle to be easily estimated.

Figure 5:
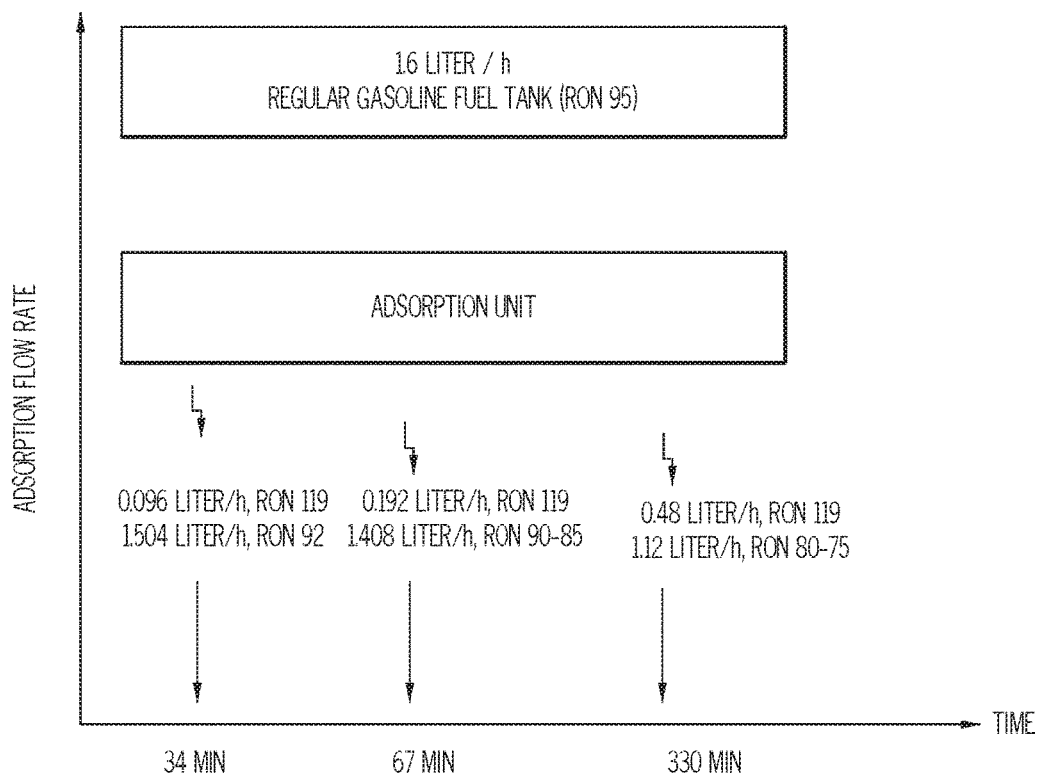
FIG. 5 illustrates an exemplary adsorbate flow rate under three separate time periods in accordance with one or more embodiments shown or described.

Referring next to FIG. 5, the amount of octane-enriched fuel that can be separated onboard by fuel system 200 that uses the zeolite-based adsorbent with the properties set forth in previously-discussed Table 2 and following Table 3 in the reactant chamber is shown. By way of one example, vehicle 100 may be configured as a passenger vehicle that consumes 6 liters of fuel per 100 kilometers averaging consumption over city and the highway distances and running at an average speed of 70 kilometers/hour; in such case, gasoline demand may be typically 4.5 liters/hour.

By way of another example, vehicle 100 may be configured as a compact vehicle that consumes 1.6 liters/hour of 95 RON gasoline that includes 30% aromatics consumed at the rate of 0.48 liters/hour. More particularly, the aromatic molecules include toluene (0.192 liters/hour), xylene (0.192 liters/hour), benzene (0.048 liters/hour) and mesitylene (0.048 liters/hour). The adsorbate amount is shown for three notional cycle times of 34 minutes, 67 minutes and 330 minutes for a 1000 cc Y-based zeolite adsorber. When this fuel stream passes through the reactant chamber, aromatic molecules separate and attract to the adsorbent particles at different rates depending on the molecule shape, size or the like.

After only 34 minutes of operation, 6% of the regular gasoline separates as high-octane gasoline with a 119 RON. Likewise, after only 67 minutes, 12% of the regular gasoline separates into the 119 RON gasoline, whereas complete equilibrium is attained after 330 minutes. The results indicate that adsorption-based OOD can be employed for onboard applications in terms of the system size and operation time.

TABLE 3

| Time (min) | Flow (l/h) | Adsorbate RON | Composition | Unadsorbed fuel flow (l/h) | Unadsorbed fuel RON |
| --- | --- | --- | --- | --- | --- |
| 0 | 0 | 0 | | 1.6 | 95 |
| 34 | 0.096 | 119 | 0.5 toluene | 1.504 | 92 |
| 67 | Min 0.192 (all toluene) | 119 | Toluene plus other aromatics | 1.408 | 85-90 |
| 330 | 0.48 | 100-120 | All aromatics | 1.12 | 75-80 |

The fuel system 200 described in the present disclosure may be used to selectively convey at least one of the original onboard market fuel 300 or one or both of an octane-rich fuel and a cetane-rich fuel to the ICE 150 depending on the need of ICE 150, where a particular operating environment associated with ICE 150 can be correlated to sensed parameters that are operated upon by the controller 170 in order to promote efficient use of the market fuel 300, while also reducing exhaust products and related emissions.

It is noted that one or more of the following claims utilize the term "wherein" as a transitional phrase. For the purposes of defining features discussed in the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is noted that terms like "preferably", "generally" and "typically" are not utilized in the present specification to limit the scope of the claims or to imply that certain features are critical, essential, or even important to the disclosed structures or functions. Rather, these terms are merely intended to highlight alternative or additional features that may or may not be utilized in a particular embodiment of the disclosed subject matter. Likewise, it is noted that the terms "substantially" and "approximately" and their variants are utilized to represent the inherent degree of uncertainty that may be attributed to any quantitative comparison, value, measurement or other representation. As such, use of these terms represent the degree by which a quantitative representation may vary from a stated reference without resulting in a change in the basic function of the subject matter at issue.

Having described the subject matter of the present disclosure in detail and by reference to specific embodiments, it is noted that the various details disclosed in the present specification should not be taken to imply that these details relate to elements that are essential components of the various described embodiments, even in cases where a particular element is illustrated in each of the drawings that accompany the present description. Further, it will be apparent to those skilled in the art that various modifications and variations can be made to the described embodiments without departing from the spirit and scope of the claimed subject matter. Thus it is intended that the specification cover the modifications and variations of the various embodiments provided such modification and variations come within the scope of the appended claims and their equivalents.

What is claimed is:

1. A vehicular propulsion system comprising:
   an internal combustion engine; and
   a fuel system cooperative with the internal combustion engine to deliver fuel to a combustion chamber that makes up a portion of the internal combustion engine, the fuel system comprising:
      an onboard fuel supply tank configured to contain a market fuel;
      a top tank configured to contain at least a portion of a flowable adsorbent;
      a separation unit configured such that upon receipt of a quantity of the market fuel from the onboard fuel supply tank and a quantity of the adsorbent from the top tank, the separation unit generates an adsorbate and a remainder at least a portion of both of which are conveyed from the separation unit to the top tank, wherein the remainder defines a first enriched fuel;
      a heat exchanger configured to selectively deliver residual thermal energy to the adsorbate in order to regenerate at least a portion of the adsorbent through the creation of a desorbate that defines a second enriched fuel;
      a bottom tank configured to contain at least a portion of the second enriched fuel;
      conduit configured to selectively fluidly couple at least the onboard fuel supply tank, top tank, bottom tank, separation unit and heat exchanger;
      a controller cooperative with the conduit to selectively convey at least one of the market fuel, the first enriched fuel and the second enriched fuel to the combustion chamber.

2. The system of claim 1, wherein the adsorbate comprises an octane-rich fuel component, while the remainder comprises a cetane-rich fuel component.

3. The system of claim 1, wherein the adsorbate comprises a cetane-rich fuel component, while the remainder comprises an octane-rich fuel component.

4. The system of claim 1, wherein the controller is further configured to determine whether the internal combustion engine is in a bypass condition or an adsorption condition such that when the controller determines that the internal combustion engine is in the bypass condition, the controller is configured to direct the market fuel to the combustion chamber without first passing through the separation unit, and when the controller determines that the internal combustion engine is in the adsorption condition, the controller is configured to direct at least a portion of the market fuel to the separation unit.

5. The system of claim 1, wherein the adsorbent comprises adsorbent particles.

6. The system of claim 5, wherein the adsorbent particles define at least one functional group that comprises at least one of activated carbon, zeolite, silica and alumina.

7. The system of claim 5, wherein the adsorbent particles define a molecular sieve comprising at least one of zeolite, metal organic framework and structured porous material.

8. The system of claim 1, wherein a portion of the conduit comprises a recycle loop for the adsorbent.

9. The system of claim 1, wherein at least one of the top and bottom tanks defines a substantially cone-shaped profile such that the portions correspond to a solid-liquid separator with the liquid portion situated adjacent a profile base and the solid portion situated adjacent a profile apex.

10. The system of claim 1, wherein at least a substantial majority of each of the first and second enriched fuels produced by the fuel system are contained within a respective one of the top and bottom tanks.

11. The system of claim 1, wherein operation of the internal combustion engine provides a source of heat for the heat exchanger.

12. The system of claim 1, further comprising a plurality of sensors cooperative with the controller such that upon determination that a signal received from at least one of the plurality of sensors indicates that the adsorbent that is present within the top tank is in a saturated state, the controller instructs the conduit to convey at least a portion of the saturated state adsorbent from the top tank to the heat exchanger in order to produce the desorbate and regenerated adsorbent.

13. A fuel system for converting a fuel into octane-rich and cetane-rich components, the fuel system comprising:
   an onboard fuel supply tank configured to contain a market fuel;
   a top tank configured to contain at least a portion of a flowable adsorbent;
   a separation unit configured such that upon receipt of a quantity of the market fuel from the onboard fuel supply tank and a quantity of the adsorbent from the top tank, the separation unit generates an adsorbate and a remainder at least a portion of both of which are conveyed from the separation unit to the top tank, wherein the remainder defines a first enriched fuel;
   a heat exchanger configured to selectively deliver residual thermal energy to the adsorbate in order to regenerate at least a portion of the adsorbent through the creation of a desorbate that defines a second enriched fuel;
   a bottom tank configured to contain at least a portion of the second enriched fuel;

conduit configured to selectively fluidly couple at least the onboard fuel supply tank, top tank, bottom tank, separation unit and heat exchanger;

a controller cooperative with the conduit to selectively convey at least one of the market fuel, the first enriched fuel and the second enriched fuel to the combustion chamber.

14. A method of delivering at least one of an onboard-generated octane-rich fuel and an onboard-generated cetane-rich fuel to an internal combustion engine through a fuel system comprising an onboard fuel supply tank, a top tank, a bottom tank, a separation unit, a heat exchanger, a plurality of sensors, a controller and conduit configured to selectively fluidly couple at least the onboard fuel supply tank, top tank, bottom tank, separation unit and heat exchanger, the method comprising:

determining by the controller whether the internal combustion engine is in a bypass condition or an adsorption condition such that when the internal combustion engine is in the adsorption condition, the controller instructs the fuel system to:

introduce a quantity of market fuel from the onboard fuel supply tank and a quantity of the adsorbent from the top tank to the separation unit to generate an adsorbate and a remainder that latter of which defines a first enriched fuel;

convey at least a portion of the adsorbate and the first enriched fuel from the separation unit to the top tank;

introduce at least some of the adsorbate to the heat exchanger from the top tank in order to regenerate the adsorbent by creating a desorbate that defines a second enriched fuel;

convey the second enriched fuel to the bottom tank; and convey the regenerated adsorbent to the separation unit; and conveying at least one of the market fuel, the first enriched fuel and the second enriched fuel to the internal combustion engine.

15. The method of claim 14, wherein a substantial entirety of fuel being conveyed to the internal combustion engine comprises conveying a cetane-rich fuel component to the combustion chamber.

16. The method of claim 14, wherein a substantial entirety of fuel being conveyed to the internal combustion engine comprises conveying an octane-rich fuel component to the combustion chamber.

17. The method of claim 14, wherein a solid-liquid separation takes place within the top tank, the separation comprising accumulating at least a portion of adsorbate in a saturated state at the bottom of the top tank while accumulating at least a portion of the first enriched fuel above the saturated state adsorbate.

18. The method of claim 14, wherein the second enriched fuel component is at least partially condensed prior to delivery to the combustion chamber.

19. The method of claim 14, wherein a portion of the conduit comprises a recycle loop for the adsorbent.

20. The method of claim 14, wherein the plurality of sensors cooperate with the controller such that upon determination that a signal received from at least one of the plurality of sensors indicates that the adsorbent that is present within the top tank is in a saturated state, the controller instructs the conduit to convey at least a portion of the saturated state adsorbent from the top tank to the heat exchanger in order to produce the desorbate and regenerated adsorbent.

\* \* \* \* \*